Dec. 12, 1939.   R. T. CLAY   2,182,961

VERNIER CONTROL

Filed Nov. 6, 1937

INVENTOR
ROY T. CLAY.
BY
ATTORNEY

Patented Dec. 12, 1939

2,182,961

UNITED STATES PATENT OFFICE 2,182,961

VERNIER CONTROL

Roy T. Clay, Buffalo, N. Y., assignor to Curtiss-Wright Corporation, a corporation of Delaware Application November 6, 1937, Serial No. 173,173

3 Claims. (Cl. 74—530)

This invention relates to adjustable control levers, providing particularly an improved means for effecting small and accurate changes in the position of a control lever with respect to a quadrant associated therewith.

An object of the invention is to provide an easily operated vernier control for a control lever.

A further object is to provide, in one embodiment, a single knob on a control lever operable to shift the lever over a wide range of adjustment to obtain coarse adjustments, and by further manipulation of the same control knob, to effect fine positioning of the lever.

Another object is to provide, in an alternative embodiment, vernier control means which may be actuated in any position of adjustment of the control lever, but which does not interfere with the operation of the lever for coarse adjustment.

Further objects will be apparent from a reading of the annexed specification and claims, together with an examination of the accompanying drawing, in which:

Figure 1:
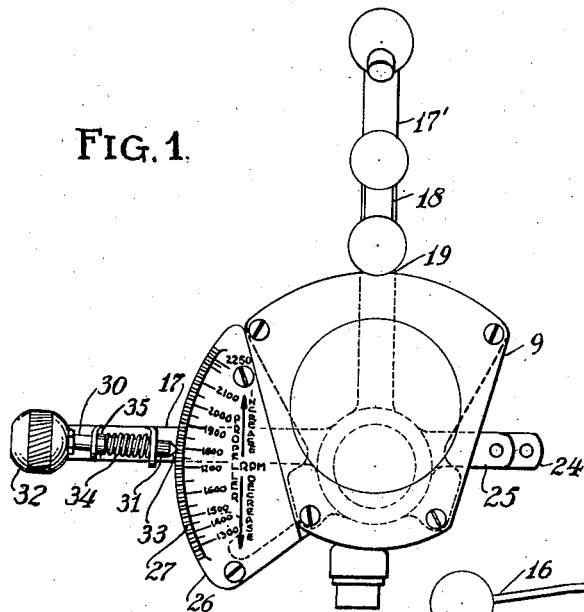
Fig. 1 is a side elevation of a quadrant and lever assembly embodying one form of the invention.
Figure 2:
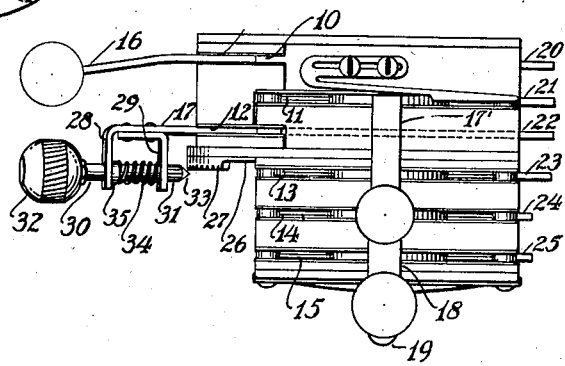
Fig. 2 is a plan view of Fig. 1.

First referring to Figs. 1 and 2, I show a composite control quadrant 9 provided with a plurality of slots 10 to 15, inclusive, within each of which levers 16 to 19, inclusive, are engaged, respectively operating control rods 20 to 25, inclusive, in the conventional manner. An assembly of this character is useful in aircraft in providing a unitary device by which a plurality of engine control levers are incorporated, such controls comprising the engine throttle, the carburetor mixture control, the spark advance, and the control for a constant speed controllable pitch propeller. The provisions of this invention are particularly adapted for the latter control, which is, as shown, the control lever 17. The quadrant 26 for the lever 17 is provided with index markings indicating engine revolutions and, by means which do not form a part of this particular invention, movements of the lever 17 are transmitted to the propeller control unit by which the governor thereof is pre-set to desired R. P. M. In the quantitative adjustment of the several power plant controls, it is desirable to accurately set the controls and particularly the propeller speed control, within accurate quantitative limits and, since a simple lever organization is difficult to control closely, means are provided for effecting a "vernier" adjustment of the lever 17. These means comprise a toothed rack 27 either attached to or integral with the quadrant 26, the teeth of the rack taking the form of bevel gear teeth. The lever 17 is provided with angular offsets 28 and 29 drilled to provide bearings for a spindle 30 having a bevel pinion 31 fixed to its inner end, and having a control knob 32 fixed to its outer end. The pinion may be pointed, as at 33, to facilitate engagement of same with the rack 27 when the spindle 30 is pressed radially inwardly by the knob 32. It will be noted that the spindle 30 is free for rotation and for axial movement, the pinion 31 providing a limit stop for outward movement of the spindle, and the base of the knob 32 forming a stop to limit the inward movement of the spindle. A spring 34 embraces the spindle 30, bearing at one end upon the bracket 29, and at its other end upon a collar 35 fixed to the spindle, this spring normally urging the spindle pinion and knob assembly radially outward.

In operation, the knob 32 is used for directly swinging the lever 17 over the quadrant 26 to approximately the position desired. Then, the knob 32 may be pressed inwardly, engaging the pinion 31 with the rack 27, whereupon the knob 32 may be rotated in the appropriate direction to effect the fine adjustment necessary. The point 33 on the bevel pinion serves as an index mark for the lever which may be brought opposite the appropriate R. P. M. mark on the scale of the quadrant.

Figure 3:
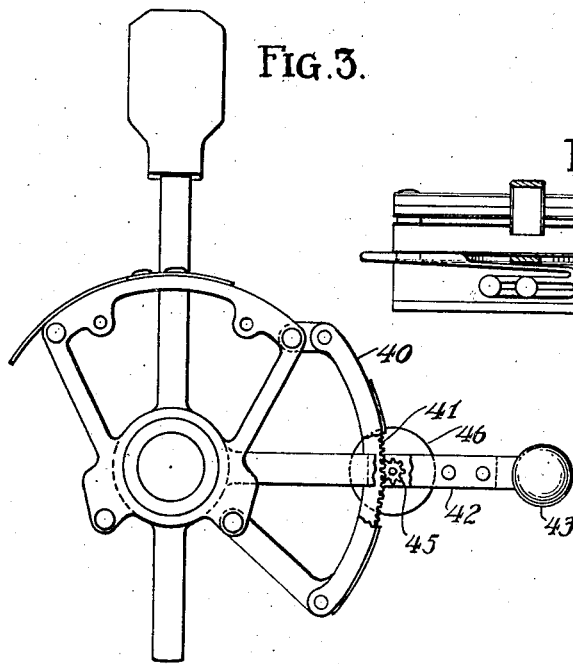
Fig. 3 is an elevation of an alternative embodiment.
Figure 4:
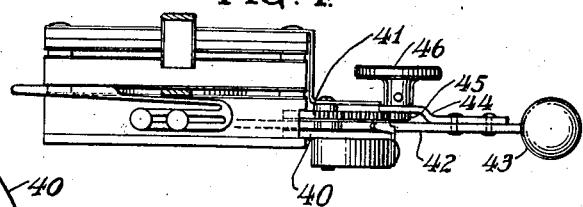
Fig. 4 is a plan view of the embodiment of Fig. 3.

Referring to Figs. 3 and 4, I show an alternative arrangement wherein a quadrant 40 has formed thereon a spur rack 41, a lever 42 having a knob 43 engaging the quadrant and being movable thereover. The lever is provided with a bracket 44 providing a bearing for a pinion 45 engaging the rack 41, the pinion shaft carrying a vernier knob 46 in a position readily accessible to the operator. Due to the spur gear and pinion arrangement, the vernier control is reversible so that direct control movements for coarse adjustment may be effected by movement of the knob 43 and the lever 42 directly. Thereafter, after coarse adjustment has been obtained, the knob 46 may be rotated to effect the fine adjustment desired.

It is known that in the prior art, vernier control adjustments have been provided, these normally taking the form of worms engaging suitable teeth on a quadrant, provision being made for turning the worm for fine adjustment, utilizing the worm as a pawl or lock to prevent movement of a control lever inadvertently. In the particular environment for which the subject device is adapted, locking of the control lever with respect to the quadrant is unnecessary, and the irreversible control afforded by prior art devices is undesirable, since friction means are used to retain the lever in position, the friction means offering sufficient drag so that the lever is retained in position but is susceptible to control movement by the operator without undue effort. Accordingly, reversibility of the vernier adjustment is a desired function, since the vernier adjustment need serve no locking purpose.

The devices described above have been embodied in, and have been found particularly useful in controls in a considerable number of aircraft.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. An adjustable control assembly comprising a slotted quadrant having gear teeth along a rim face thereof, a control lever pivotally movable relative to said quadrant and passing through said slot, a bracket on the lever, a spindle rotatable and slidable in said bracket having a pinion engageable, when said spindle is slid inwardly, with said gear teeth, and a knob on the outer end of said spindle for directly moving said lever in the quadrant and for turning said pinion, when the latter is engaged with the gear teeth.

2. An adjustable control assembly comprising a quadrant having a bevel toothed rack disposed at a rim face thereof, a control lever engaged with said quadrant, substantially radially alined bearings on said lever, a spindle engaged in said bearings, rotatable and slidable relative thereto, a bevel pinion on the inner end of said spindle and a knob on the outer end thereof, said bevel pinion being turnable and engageable with said rack by manipulation of said knob for finely adjusting the lever, the knob being directly movable when the pinion is disengaged from said rack to move said lever in said quadrant for coarse adjustment.

3. An adjustable control assembly comprising a quadrant having a bevel toothed rack disposed at a rim face thereof, a control lever engaged with said quadrant, substantially radially alined bearings on said lever, a spindle engaged in said bearings, rotatable and slidable relative thereto, a bevel pinion on the inner end of said spindle and a knob on the outer end thereof, said bevel pinion being turnable and engageable with said rack by manipulation of said knob for finely adjusting the lever, the knob being directly movable when the pinion is disengaged from said rack, to move said lever in said quadrant for coarse adjustment, and resilient means urging said pinion to a rack-disengaging position.

ROY T. CLAY.